United States Patent

[11] 3,628,936

| [72] | Inventors | Emile Plumat<br>Gilly;<br>Marcel Duperroy, Ransart, both of Belgium |
|---|---|---|
| [21] | Appl. No. | 762,390 |
| [22] | Filed | Sept. 25, 1968 |
| [45] | Patented | Dec. 21, 1971 |
| [73] | Assignee | Glaverbel S.A.<br>Watermael-Bortsfort, Belgium |
| [32] | Priority | Sept. 25, 1967 |
| [33] | | Luxembourg |
| [31] | | 54526 |

[54] METHOD AND APPARATUS FOR SHEET GLASS FABRICATION
24 Claims, 7 Drawing Figs.

[52] U.S. Cl................................................. 65/90,
65/125, 65/193, 65/203, 65/337, 65/338, 65/344,
65/356
[51] Int. Cl...................................................... C03b 15/00
[50] Field of Search............................................ 65/90, 121,
125, 182, 196, 203, 337, 338, 339, 344, 356, 374,
193

[56] References Cited
UNITED STATES PATENTS

| 1,695,547 | 12/1928 | Grolemond | 65/337 |
|---|---|---|---|
| 2,255,578 | 9/1941 | Baker | 65/374 X |
| 3,231,351 | 1/1966 | Brichard | 65/182 X |
| 3,463,625 | 8/1969 | Olink | 65/203 X |

*Primary Examiner*—S. Leon Bashore
*Assistant Examiner*—J. B. Hardaway
*Attorney*—Spencer & Kaye ABSTRACT: A method and apparatus for producing sheet glass drawn from a molten glass bath in a drawing kiln in which a forward current of hot glass flows upon a return current of cooler glass flowing in the opposite direction by intercepting a portion of the forward current at a point directly downstream of the point where the glass is drawn from the bath for causing only glass from the intercepted portion of the forward current to be drawn.

PATENTED DEC 21 1971  3,628,936

INVENTORS
Emile Plumat
Marcel Duperroy

BY Spencer & Kaye

ATTORNEYS

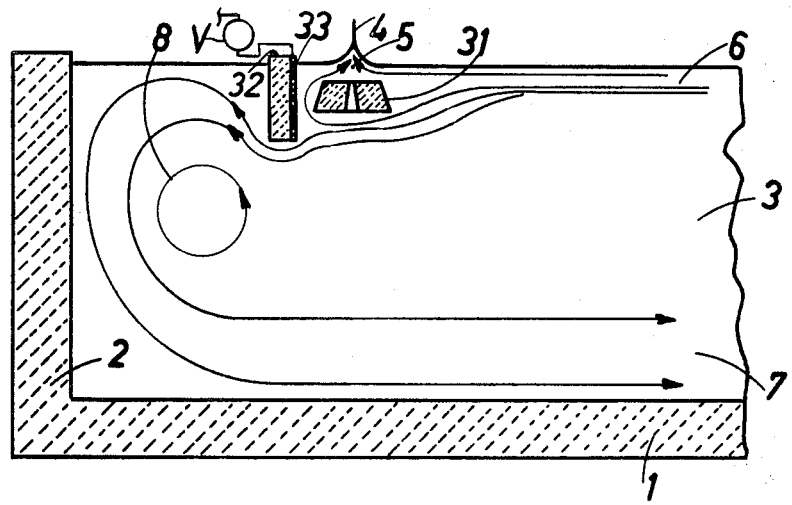
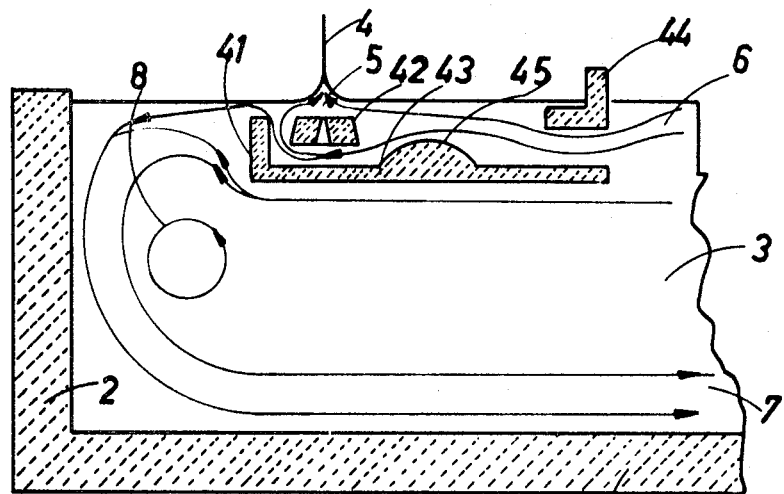
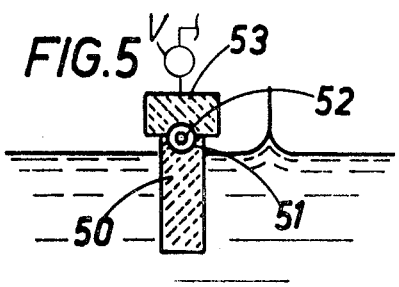
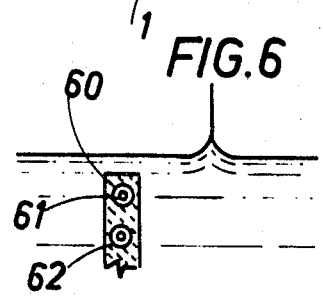

METHOD AND APPARATUS FOR SHEET GLASS FABRICATION

BACKGROUND OF THE INVENTION

The present invention relates to a process and apparatus for the manufacture of glass in sheets by drawing a continuous ribbon from a molten glass bath in which a forward current of hot glass flows upon a return current flowing in the opposite direction and having a lower temperature.

Known drawing processes of this type are performed by drawing the ribbon from a bath of glass in a drawing kiln whose width is somewhat greater than that of the drawn ribbon.

The depth of the kiln is substantially equal to that of the glass-melting tank furnace to which the kiln is connected via a canal having the same depth as the kiln. With this arrangement, the molten glass in the drawing kiln is drawn into the convection currents present in the tank furnace and the convection currents in the tank furnace extend to the end of the drawing kiln. An upper current of hot glass coming directly from the tank furnace is therefore present in the drawing kiln. This forward current circulates over a submerged current of cooler glass which returns to the tank furnace, more particularly to the "hot spot" thereof, where the return current rises to the surface to feed the forward current. In the drawing kiln, the drawn ribbon is therefore mainly fed by the forward current.

This method ensures that a drawn product of satisfactory quality is obtained due to the fact that the large quantity of glass in the drawing kiln tends to impart a uniform temperature to all of the molten glass which is actually drawn, this depending on the thermal capacity of the molten glass.

Since the molten glass in the kiln participates in the convection current in the tank furnace, the molten glass surface layer from which the ribbon is drawn is constantly supplied with fresh glass coming directly from the refining zone of the tank furnace. The speed at which the surface layer is supplied is, moreover, fairly high, since the quantity of fresh glass supplied to the drawing kiln by the forward current is larger than the quantity of glass drawn and since it is the forward current which feeds the return current.

The fairly high speed of the forward and return currents has a further advantage in that it supplies sufficient heat to the drawing kiln, so that there is no need to provide heating means for the kiln or its contents, which often produce thermal heterogeneities and pollute the glass. Lastly, a further advantage to be taken into account is that if the forward current contains gases or unmelted inclusions, they have some opportunity to return to the tank furnace with the return current and to there be reabsorbed in the melting zone.

However, the quality of the resulting product is capable of further improvement.

Downstream of the point where the glass ribbon is drawn, that portion of the forward current which has not fed the ribbon descends along the drawing kiln end wall to form the return current moving back toward the tank furnace. The 180° change in direction which the current thus makes produces a vortexlike current of glass between the forward and return currents. Some portions of the glass circulating in the vortex may from time to time be released therefrom and could then pollute the fresh glass feeding the ribbon because the glass circulating in the vortex has had an opportunity to cool so that when it enters the fresh glass it forms a thermal heterogeneity which impairs the quality of the finished product.

Such pollution is quite possible because glass released from the vortex can readily enter the glass being fed to the ribbon due to the fact that the base, or root, of the drawn ribbon is generally stabilized by a debiteuse or draw bar, completely submerged just below the surface of the molten glass in the path of the forward current.

Upstream of the debiteuse, the forward current divides into two portions. The first portion passes above the debiteuse and feeds the front face of the ribbon. The second portion passes below the debiteuse and rises up again downstream thereof. This second portion then divides to feed, on the one hand, the rear surface of the drawn ribbon and, on the other hand, the return current.

The glass in the vortex can contact the second portion of the forward current which has plunged below the debiteuse, at a location upstream of the place where this portion rises up again and divides to feed the ribbon. At least a portion of the glass released from the vortex and reaching this location is therefore very likely to enter the drawn ribbon.

SUMMARY OF THE INVENTION

It is a primary object of the present invention to eliminate or substantially reduce these drawbacks and difficulties.

Another object of the invention is to substantially improve the quality of drawn glass.

A further object of the invention is to prevent the feeding of the drawn ribbon with glass from various regions of the drawing kiln.

Still another object of the invention is to rigorously control the supply of glass to the ribbon.

These and other objects according to the invention are achieved by the provision, in a process for manufacturing glass by drawing a continuous ribbon from a molten glass bath in which a forward current of hot glass flows upon a return current of cooler glass flowing in the opposite direction, of the improvement composed of intercepting a portion of the forward current close to and downstream of the point where the ribbon emerges from the bath for feeding the ribbon exclusively with glass from the intercepted portion of the forward current. This interception serves to cause glass released from the vortex formed where the forward current flows into the return current to enter only that portion of the forward current which feeds the return current.

In a first embodiment of the invention, only that quantity of glass which is required to form the ribbon is intercepted from the forward current.

In a second embodiment of the invention, a quantity of glass greater than that needed to form the ribbon is intercepted from the forward current, and the excess glass is reintroduced, downstream of the place where the glass ribbon is drawn, into that portion of the forward current which has not been intercepted. The latter method has the advantage that the quantity of glass intercepted need not always be regulated in relation to the thickness of the draw ribbon, and thus allows more freedom during the performance of the process.

The objects of the invention are also achieved by the provision, in apparatus for manufacturing glass by drawing a continuous ribbon from a molten glass bath in a drawing kiln in which a forward current of hot glass flows upon a return current of cooler glass flowing in the opposite direction, of the improvement composed of a barrier of refractory material disposed in the bath directly downstream of the point where the ribbon leaves the bath for intercepting a portion of the forward current and so as to feed the ribbon exclusively with glass from the intercepted portion of the forward current, the lower extremity of the barrier extending no lower than the boundary between the forward and return currents. This boundary is generally at a level of around one-third the depth of the bath in the kiln, measured from the bath surface.

The barrier thus located forces a portion of the forward current not feeding the ribbon to pass below the barrier. This portion rises up again downstream of the barrier. Any glass released from the vortex and entering the forward current will, therefore, enter downstream of the barrier, i.e., such glass will be forced to join the return current and will thus not be given the opportunity to pollute the fresh glass feeding the base of the ribbon.

In some cases the barrier also enables the debiteuse to be dispensed with, since the barrier itself stabilizes the base of the ribbon.

Preferably, the upper portion of the barrier extends above the bath of molten glass. This prevents the drawn ribbon from attracting glass which has already passed downstream of the barrier in those situations where the quantity of glass intercepted by the barrier is not much greater than that taken by the ribbon.

Advantageously, to control the attachment of the base of the ribbon to the barrier and to avoid the formation of devitrified glass, the barrier is provided with a heating device to control the temperature of the glass in the vicinity of the barrier.

To this end, the barrier can be made of an electrically conductive refractory material having a lower resistivity than that of the glass in contact with the barrier and can be supplied with an electric current.

Refractory materials suitable for this purpose are, for instance, tin oxide, zirconium oxide, molybdenum and tungsten.

Advantageously, to prevent the barrier from being eroded by the glass feeding the ribbon, at least the surface of the barrier facing the region where the glass ribbon is drawn is covered with a platinum sheet. If the barrier is made of an electrically nonconductive material, the platinum sheet can be supplied with electric current to the heat the barrier.

BRIEF DESCRIPTION OF THE DRAWINGS

FIG. 3 is a view similar to that of FIG. 1 of a different kiln provided with an embodiment of the invention.

FIG. 4 is a view similar to that of FIG. 3 showing a further embodiment of the invention.

FIG. 5 is a cross-sectional detail view showing one form of construction of an embodiment of the invention.

FIG. 6 is a view similar to that of FIG. 5 of a form of construction of another embodiment of the invention

DESCRIPTION OF THE PREFERRED EMBODIMENTS

Figure 1:
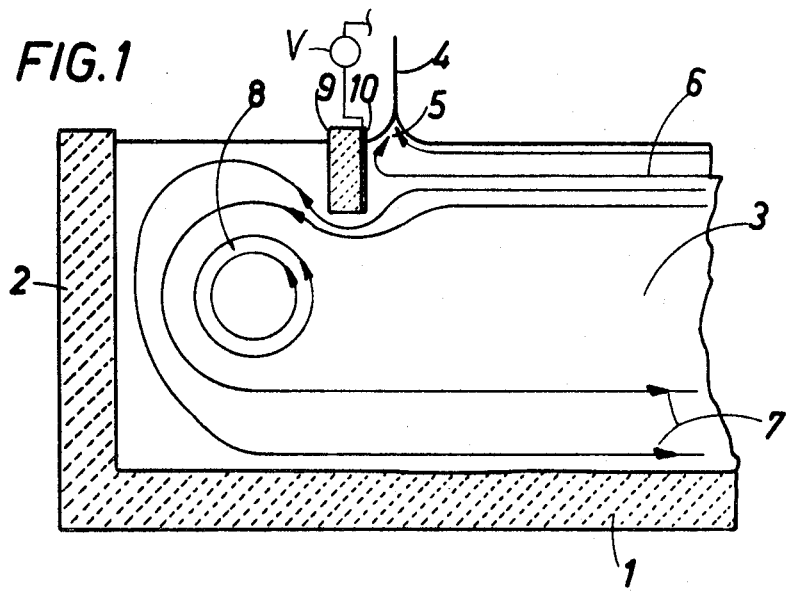
FIG. 1 is a longitudinal cross-sectional view of a drawing kiln provided with one embodiment of the present invention.

FIG. 1 shows only those elements needed for understanding the invention.

The drawing kiln is formed by a simple rectangular basin having vertical sidewalls and a bottom wall 1 which is at the same level as the bottom of the tank furnace (not shown). The drawing kiln is connected to the tank furnace via a canal of rectangular section having the same depth and substantially the same width as the drawing kiln.

The canal terminates at the upstream end wall of the kiln, such wall being in reality practically nonexistent as a result of the similar dimensions of the canal and the kiln. The vertical end wall 2 of the kiln faces the canal.

A ribbon of glass 4 drawn from the bath 3 in the drawing kiln is fed from a meniscus 5 forming on the surface of the molten glass by the drawing operation. The glass ribbon 4 can be entrained by the rollers of a drawing machine (not shown) of either the vertical or horizontal type, since the invention can be applied equally well to both kinds of drawing. As a rule, the drawing machine is disposed beyond a drawing chamber (not shown) in which the drawn glass is conditioned before it can be contacted by the rollers of the drawing machine.

Two main currents flowing in respectively opposite directions exist in the kiln due to the depth of the kiln and its manner of connection to the tank furnace via a relatively large canal.

The first upper current 6 comes directly from the melting zone and is formed by hot glass. This current extends across the entire width of the kiln and is constituted by substantially the upper third of the glass in the kiln. This current circulates over a return current 7 of cooler glass which is returning to the tank furnace. Downstream of the meniscus 5, the return current 7 is fed by the forward current 6 descending along the wall 2. In principle, the meniscus 5 is fed exclusively by the forward current. In the region where the forward current 6 flows into the return current 7 a vortexlike current 8 is set up and forms a stagnant body of glass with respect to the currents 6 and 7.

Since this stagnant body of glass will have different characteristics from the glass in the forward current 6, it is imperative to prevent any glass released from the vortex 8 from entering that portion of the forward current which feeds the meniscus 5.

This is achieved, according to the present invention, by a barrier 9 of refractory material disposed directly downstream of the meniscus and extending perpendicularly to the forward current across the entire width thereof. The distance between the median plane of the glass ribbon 4 and the front surface of the barrier can be of the order of 10 cm. The depth of immersion of the barrier in the bath 3 is such that it intercepts a quantity of glass in the forward current which is larger than that required to feed the ribbon 4. For example, in a drawing kiln in which the molten glass is 1 m. deep, the barrier can be immersed to a depth of 18 cm. The upper portion of the barrier 9 extends above the surface of bath 3 to prevent any glass which has passed downstream thereof from getting into the meniscus 5.

The front surface of the barrier 9 is covered with a platinum sheet 10 to protect the refractory material of which the barrier is made against corrosion. A material very suitable for the barrier is fritted or electrically cast alumina. The platinum sheet can be connected to a voltage source so as to support an electric current which produces heat by the Joule effect, and thus to prevent the formation of devitrified glass while regulating the stability of the meniscus 5.

In operation, the barrier 9 intercepts a portion of the forward current and the intercepted portion divides into two fractions, the first fraction feeding the meniscus and the other fraction descending along the barrier to rise up again downstream thereof. One effect of this rising up is to cause the change in the direction between the forward current and the return current to form an angle greater than 180°, thus more precisely locating the vortex current 8. Moreover, any glass released from the thus located vortex 8 can flow into only that portion of the forward current which will join the return current 7, i.e., that forward current portion which flows below barrier 9.

The presence of a barrier has the further advantage of causing the ribbon 4 to be fed exclusively by the upper portion of the forward current 6. This portion of the current is, as a rule, of satisfactory quality as regards bubbles and homogeneity.

It is often preferably that the lower portion of the barrier be connected to a horizontal plate of refractory material extending below the region where the glass ribbon is drawn in order to isolate a portion of the forward current. This further ensures that no glass released from the vortex will find its way into the ribbon.

The plate also prevents glass released from any secondary smaller vortexes between the forward and return currents from polluting the glass feeding the ribbon.

The plate should be disposed below the debiteuse, if one is used. Preferably, to be sure of eliminating secondary vortexes existing upstream of the debiteuse and caused thereby, the upper surface of the horizontal plate has a threshold portion upstream of the debiteuse.

Advantageously, the horizontal plate can extend as far as below the shut off, if any, in the canal at the entry to the drawing kiln, to eliminate the effects of secondary vortexes as far as possible.

As in the case of the barrier, at least a portion of the horizontal plate advantageously has a heating device to control the temperature of the glass. In this case also, the portion of the horizontal plate to be heated can be made of an electrically conductive refractory material having a resistivity lower than that of the glass in contact with the plate, and can be supplied with electric current via its sidewalls.

Advantageously, to prevent the upper surface of the horizontal plate from being eroded, at least a portion thereof is covered with a platinum sheet. A portion of the platinum sheet can be supplied with electric current to heat at least a portion of the horizontal sheet.

Figure 2:
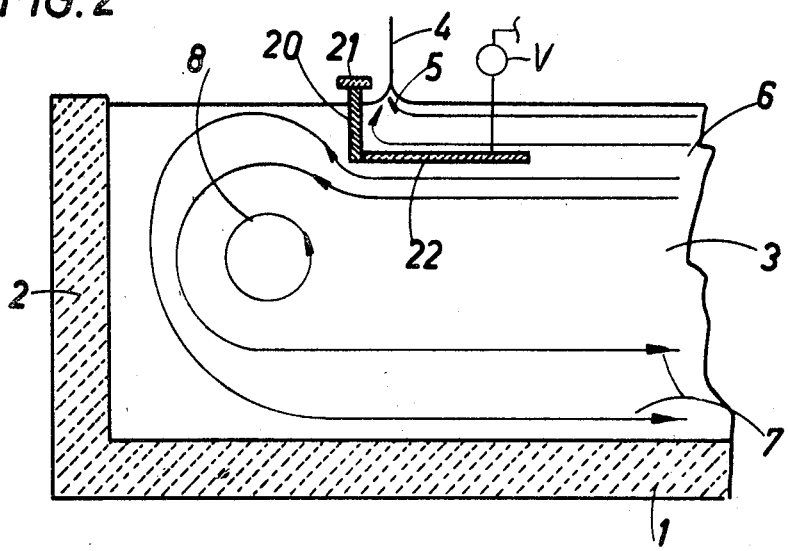
FIG. 2 is a view similar to that of FIG. 1 showing another embodiment of the invention.

FIG. 2 shows such an embodiment of the invention which includes a barrier 20 which extends above the surface of bath 3. The barrier 20 is preferably made of an electrically conductive refractory material whose resistivity is lower than that of the glass, so that the barrier can be heated by sending an electric current therethrough. Since the resistivity of glass is about 350 ohm-cm. at a temperature of 1,000° C., which is approximately the temperature of the meniscus 5, the resistivity of the refractory material advantageously should not exceed 100 ohm-cm. The requirement is met by tin oxide. The barrier is supplied with electric current via its ends so as to heat it to a temperature slightly higher than the temperature of the glass.

The tin oxide barrier 20 extends down to a depth of the order of 7 cm. below the bath surface, so that it only intercepts a quantity of glass substantially equal to that required for forming the ribbon 4. As in the embodiment illustrated in FIG. 1, the distance between the median plane of the ribbon 4 and the front surface of the barrier 20 is of the order of 10 cm.

The portion of the barrier 20 standing above the molten bath surface has a covering 21 of a composite cellular material forming a heat insulator. The covering 21 is provided to insulate the upper portion of the barrier 20 from the action of coolers (not shown) normally provided in the drawing chamber. The covering 21 overlaps the barrier to create a shielded zone at the level of the bath surface for protecting the glass at this level from the action of such coolers in order to keep the temperature slightly above the temperature of liquidus of the glass.

Figure 2A:
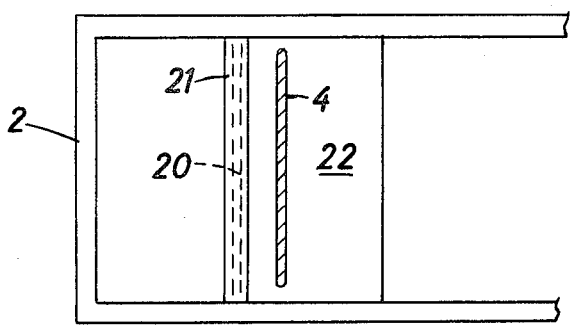
FIG. 2a is a plan view, to a reduced scale, of the embodiment of FIG. 2.

The lower portion of the barrier 20 has a horizontal plate 22 extending below the meniscus 5. The plate 22 divides the forward current 6 into two portions well before it arrives at the meniscus, the plate thus delimiting the portion of the forward current which will feed the drawn ribbon. The barrier 20 and plate 22 extend across the entire width of the kiln as shown in FIG. 2a.

The portion of the forward current which passes below the plate 22 rises up again downstream of the barrier and absorbs glass released from the vortex 8 to deliver such glass to the return current 7.

The horizontal plate 22 ensures that glass released from the vortex 8 will not reach the meniscus 5, which might otherwise tend to occur since the barrier is immersed to only a small depth in the bath. When the depth of barrier immersion is small, the amount by which glass rises up again downstream of the barrier is not very pronounced, and there is then a risk that glass released from the vortex could reach a point upstream of the barrier 20 as a result of the pull exerted by the drawn ribbon 4. Such glass is prevented from reaching meniscus 5 by plate 22.

The plate 22 is made of a high-quality refractory material, for example, electrically cast alumina based refractories such as Zac or monofrax. (trademarks, the first belonging to Corhart and the second to Harbison-Carborundum Corp.)

In some cases it might be desirable to provide those surfaces of the barrier 20 and the plate 22 over which the glass passes to feed the meniscus 5 with a platinum coating to prevent this glass from being polluted by erosion products.

According to one modification, the barrier 20 and the plate 22 could be constructed in one L-shaped piece from an electrically conductive or nonconductive material. If the L-shaped piece is made of a nonconductive material, heating can be provided by means of an electric current through the platinum sheets lining its inner surface, or by heating devices which will be described hereinafter with reference to FIGS. 5 and 6.

Turning now to FIG. 3, there is shown a drawing kiln of the type provided with a debiteuse 31 which stabilizes the meniscus 5. Disposed downstream of the debiteuse 31 and extending above the surface of the bath 3 is a barrier 32 made of refractory material and similar to the barrier 9 of FIG. 1. The front face of the barrier has a platinum sheet 33 whose function has been described above. The front surface of the barrier is approximately 5 cm. from the rear end of the debiteuse, while the lower surface of the barrier is below the lower surface of the debiteuse 31, so that the barrier intercepts the forward current 6.

In the operation of this unit, the meniscus 5 is partly fed directly by the surface portion of the forward current and partly by that portion of the forward current which passes beneath and around the debiteuse. That portion of the forward current which is intercepted by the barrier 32 but which does not feed the meniscus 5 descends below the barrier to rise up again downstream thereof, where it creates the same effects as those described above as regards glass released from the vortex 8.

It may be seen from FIG. 3 that if the barrier 32 were not provided, glass released from the vortex 8 could very readily pollute the current of glass passing beneath the debiteuse 31 to directly feed the rear surface of the drawn ribbon 4.

In the embodiment illustrated in FIG. 4, the lower surface of the barrier 41, which is disposed downstream of the debiteuse 42, is again below that of the debiteuse 42. However, the upper portion of the barrier does not extend above the surface of the bath 3, but is, for instance, 5 cm. therebelow.

The lower portion of the barrier 41 is continued by a horizontal plate 43 extending to a point below the shutoff 44 disposed at the entry to the drawing kiln. Upstream of the debiteuse, the plate 43 has a threshold 45 with a hydrodynamic profile.

In operation, the forward current 6 is divided into tow portions. The first portion, which is constituted by the surface glass of the forward current, passes above the plate 43 and moves towards the debiteuse. The other portion passes below the plate 43 and goes directly to feed the return current 7 after rising up again downstream of the barrier 41 and then descending along the wall 2 of the kiln.

Since the plate 43 is below the debiteuse, and a space must be left between the lower surface of the debiteuse and the upper surface of the plate 43, the amount of glass passing above plate 43 will be greater than that drawn into the ribbon. The excess glass will flow over the barrier 41 and rejoin that portion of the forward current which rises up again downstream of the barrier 41.

The purpose of the threshold 45 on the upper surface of the plate 43 is to eliminate the effects of vortexes existing upstream of the debiteuse since, in the absence of the members 42, 43 and 45, that portion of the forward current which meets the debiteuse and descends therebelow would be divided into two currents one of which would actually pass below the debiteuse while the other of which would be entrained by the return current to generate these vortexes. The plate 43 and its threshold 45 eliminate these vortexes and prevent any thin trickle of glass, which may originate in the zone of separation between the forward current 6 and the return current 7, from polluting the surface portion of the forward current.

Preferably, the barrier 41 and the plate 43 are constructed from a number of pieces of electrically conductive or nonconductive refractory material.

If the barrier 41 is constructed from an electrically nonconductive refractory material, it can be heated by the device to be described below with reference to FIG. 6. Another way of heating the barrier is to send an electric current through platinum sheets covering the front surface thereof. The same applies to the heating of some or all of the horizontal plate 43. A portion which can advantageously be made heatable is the portion situated between the barrier 41 and the threshold 45.

Whatever the heating means employed may be, advantageously, as in the embodiments illustrated in FIGS. 1 through 3, the front surface of the barrier and the upper surface of the horizontal plate are clad with platinum to prevent the glass from being polluted by products of the erosion of these members.

FIG. 5 shows a detail of a heating device for a barrier 50 disposed downstream of the meniscus, the upper portion of the barrier extending above the surface of the molten glass. The upper surface of the barrier, which barrier is made of electrically cast alumina of high purity, is formed with a groove 51 for receiving an electrical resistance heating element 52 made, for instance, of $MoSi_2$. The assembly is covered with a lid 53 made of a composite cellular material forming a heat insulation and provided with a groove in its lower surface. Preferably, the lid 53 is wider than the barrier 50, to produce a shielded zone at the bath surface level in relation to the coolers disposed in the drawing chamber.

In the embodiment illustrated in FIG. 6, which has a barrier 60 similar to that of FIG. 4, the upper portion of the barrier being below the surface of the molten glass, heating is performed by electrical resistance elements 61 disposed in passages 62 formed in the barrier.

The heating method illustrated in FIG. 6 can also be used for heating other members immersed in the glass, for instance, the horizontal plate which is sometimes provided below the meniscus.

It will be understood that the above description of the present invention is susceptible to various modifications, changes and adaptation.

We claim:

1. In a process for manufacturing glass by drawing a continuous ribbon from a molten glass bath in a drawing kiln having a downstream end wall and in which a forward current of hot glass flows upon a return current of cooler glass flowing in the opposite direction, the improvement comprising intercepting only a portion of the forward current close to and downstream of the point where the ribbon emerges from the bath and upstream, and at a location spaced from, the downstream end wall of the drawing kiln for feeding the ribbon exclusively with glass from the intercepted portion of the forward current.

2. A process as defined in claim 1 wherein only that quantity of glass which is required to form the ribbon is intercepted.

3. A process as defined in claim 1 wherein a quantity of glass greater than that needed to form the ribbon is intercepted, the excess glass being reintroduced, downstream of the point where the glass ribbon is drawn, into that portion of the forward current which has not been intercepted.

4. In apparatus for manufacturing glass by drawing a continuous ribbon from a molten glass bath in a drawing kiln having a downstream end wall and in which a forward current of hot glass flows upon a return current of cooler glass flowing in the opposite direction, the improvement comprising a barrier of refractory material extending across the entire width of said drawing kiln and disposed in the bath directly downstream of the point where the ribbon leaves the bath and upstream of the downstream end wall of the drawing kiln for intercepting a portion of the forward current and so as to feed the ribbon exclusively with glass from the intercepted portion of the forward current, the lower extremity of said barrier extending no lower than the boundary between said forward and return currents.

5. An arrangement as defined in claim 4, wherein the upper portion of said barrier extends above the bath surface.

6. An arrangement as defined in claim 4, wherein said barrier includes heating means.

7. An arrangement as defined in claim 6 wherein said barrier is made of an electrically conductive refractory material having a lower resistivity than that of the glass in contact with said barrier, said barrier being provided with electric current to constitute said heating means.

8. An arrangement as defined in claim 7 wherein such electric current is supplied between two ends of said barrier.

9. An arrangement as defined in claim 4 wherein said barrier is provided, at that surface thereof which faces the point where the ribbon leaves the bath, with a platinum covering sheet.

10. An arrangement as defined in claim 9 further comprising means connected to said platinum sheet for passing an electric current therethrough to heat said barrier.

11. An arrangement as defined in claim 4 further comprising a horizontal plate of refractory material having one end connected to the lower end of said barrier and extending below the point where the ribbon leaves the bath for isolating a portion of the forward current from the remainder of the bath.

12. An arrangement as defined in claim 11 wherein said apparatus includes a debiteuse immersed in the bath and defining the point where the ribbon leaves the bath, sand said plate extends below said debiteuse.

13. An arrangement as defined in claim 11 wherein said apparatus is provided with a shut off near the inlet of said kiln and said horizontal plate extends to a point beneath said shutoff.

14. An arrangement as defined in claim 11, further comprising means connected to a part of said horizontal plate for heating said part.

15. An arrangement as defined in claim 16 wherein said means for heating comprise means connected between the lateral edges of said plate for passing an electric current between those edges.

16. An arrangement as defined in claim 14 wherein, for heating said part of said plate, such part is made of an electrically conductive refractory material having a lower resistivity than that of the glass in contact with the sheet and is arranged to be supplied with an electric current.

17. An arrangement as defined in claim 11 further comprising a platinum sheet covering at least a portion of the upper surface of said plate.

18. An arrangement as defined in claim 17 further comprising means connected to at least a portion of said platinum sheet for supplying an electric current to heat the portion of said horizontal plate upon which said sheet is mounted.

19. An arrangement as defined in claim 11 wherein said plate extends across the entire width of said drawing kiln.

20. An arrangement as defined in claim 4 wherein said barrier is spaced from said downstream end wall of said kiln to define a space between said barrier and said end wall and above the lower extremity of said barrier through which flows a part of the forward glass current which passes under the barrier.

21. An arrangement as defined in claim 4 wherein the upper extremity of said barrier is below the bath surface for permitting part of the forward current intercepted by said barrier to flow thereover and to be reintroduced, downstream of the point where the ribbon leaves the bath into that portion of the forward current which is not intercepted.

22. An arrangement as defined in claim 11 wherein the upper portion of said barrier extends above the surface and said kiln is free of any body, other than molten glass, disposed in a vertical line between the point where the ribbon leaves the bath and said horizontal plate.

23. In apparatus for manufacturing glass by drawing a continuous ribbon from a molten glass bath in a drawing kiln having a downstream end wall and in which a forward current of hot glass flows upon a return current of cooler glass flowing in the opposite direction, the apparatus including a debiteuse immersed in the bath and defining the point where the ribbon leaves the bath, the improvement comprising a barrier of refractory material disposed in the bath directly downstream of the point where the ribbon leaves the bath and upstream of the downstream end wall of the drawing kiln for intercepting a portion of the forward current and so as to feed the ribbon exclusively with glass from the intercepted portion the forward current, the lower extremity of said barrier extending no lower than the boundary between said forward and return currents, and a horizontal plate of refractory material having one end connected to the lower end of said barrier and extending below said debiteuse and thus below the point where the ribbon leaves the bath, for isolating a portion of the forward current from the remainder of the bath, said plate being provided on its upper surface with a threshold portion having a hydrodynamic profile, extending upwardly from said plate, and disposed upstream of said debiteuse with respect to the direction of flow of said forward current.

24. In apparatus for manufacturing glass by drawing a continuous ribbon from a molten glass bath in a drawing kiln having a downstream end wall and in which a forward current of hot glass flows upon a return current of cooler glass flowing in the opposite direction, the improvement comprising a barrier of refractory material disposed in the bath directly downstream of the point where the ribbon leaves the bath and upstream of the downstream end wall of the drawing kiln for intercepting a portion of the forward current and so as to feed the ribbon exclusively with glass from the intercepted portion of the forward current, the lower extremity of said barrier extending no lower than the boundary between said forward and return currents and the upper portion of said barrier extending above the bath surface, wherein said barrier is disposed entirely downstream of the point where the ribbon leaves the bath and the interior of said kiln is free of any body, other than molten glass, disposed in a vertical line with the point where the ribbon leaves the bath.

* * * * *

UNITED STATES PATENT OFFICE
CERTIFICATE OF CORRECTION

Patent No. 3,628,936          Dated December 21st, 1971

Inventor(s) Emile Plumat and Marcel Duperroy

It is certified that error appears in the above-identified patent and that said Letters Patent are hereby corrected as shown below:

In the heading of the patent, line 8, change "Bortsfort" to --Boitsfort--. Column 2, line 48, change "draw" to --drawn--. Column 3, line 24, before "heat" delete "the". Column 4, line 31, after "source" insert --V--; line 51, change "preferably" to --preferable--. Column 5, line 58, change "monofrax" to --Monofrax--. Column 6, line 31, change "tow" to --two--. Column 8, line 12, change "sand" to --and--; line 21, change "15" to --16--; same line, change "16" to --15--; line 25, change "16" to --15--.

Signed and sealed this 21st day of November 1972.

(SEAL)
Attest:

EDWARD M. FLETCHER, JR.
Attesting Officer

ROBERT GOTTSCHALK
Commissioner of Patents